United States Patent [19]
Levinson

[11] Patent Number: 5,057,331
[45] Date of Patent: Oct. 15, 1991

[54] COOKING FOOD IN A FOOD PREPARATION KIT IN A MICROWAVE AND IN A THERMAL OVEN

[76] Inventor: Melvin L. Levinson, 140 W. Willow St., Colonia, N.J. 07067

[21] Appl. No.: 296,234

[22] Filed: Jan. 13, 1989

[51] Int. Cl.$^5$ .............................................. H05B 6/64
[52] U.S. Cl. .................................. 426/243; 426/523; 219/10.55 M; 219/10.55 E; 99/DIG. 14
[58] Field of Search ............... 219/10.55 M, 10.55 E, 219/10.55 F, 10.55 R; 426/241, 234, 243, 244, 242, 466, 523, 524; 99/DIG. 14, 451

[56] References Cited

U.S. PATENT DOCUMENTS

| | | | |
|---|---|---|---|
| 3,569,656 | 3/1971 | White et al. | 219/10.55 B |
| 3,985,990 | 10/1976 | Levinson | 219/10.55 E |
| 4,390,555 | 6/1983 | Levinson | 426/243 |
| 4,831,227 | 5/1989 | Eke | 219/10.55 M |
| 4,868,360 | 9/1989 | Duncan | 219/10.55 E |
| 4,871,892 | 10/1989 | Samford | 219/10.55 E |
| 4,906,806 | 3/1990 | Levinson | 219/10.55 E |

Primary Examiner—Philip H. Leung

[57] ABSTRACT

Improvements in and new methods of using a prior art cooking kit are taught. The prior art kit includes an imperforate, metal outer pot, a perforated, metal inner pot, which nests in the outer pot, and a microwave-shielded, food by-product collection chamber between the two pots. A microwave-transparent cover covers the pots and forms a steam-confining, cooking chamber there between. Improvements include an adjustable, "skewer/support/grill" apparatus, improved handle construction, drainage-fabrication and shape. New methods of combining the cooking of food in a microwave oven and in a thermal oven are taught. The food includes soup, poultry, meat, fish, vegetables, stuffing recipes and crusting recipes. Methods taught concern: a) cooking one food with the by-product of a microwave cooking food, b) fully cooking a food in a microwave oven before frying, baking or broiling the food in a thermal oven, c) baking and crusting a food at temperatures over 500° F., d) using a tapered pot to cook meat, e) an adjustable, "skewer/support apparatus", f) utilizing a heavy, preheated, igneous-rock, thermal heat-sink and g) "hot cubes".

29 Claims, 6 Drawing Sheets 5,057,331

COOKING FOOD IN A FOOD PREPARATION KIT IN A MICROWAVE AND IN A THERMAL OVEN

BACKGROUND OF THE INVENTION

1. Field of the Invention

The present invention concerns apparatus and methods for cooking food, in a microwave oven and/or in a thermal oven, in an improved, prior-art, microwave food preparation apparatus.

2. Description of the Prior Art

Prior art teaches to use microwave browning grills, microwave-convection ovens, microwave-electric ovens and the sequential heating of a food first in a microwave oven and then on or in a conventional range. Notwithstanding, many believe that the time honored cooking results of gas and electric cooking, have not yet been achieved in microwave cooking.

This invention concerns apparatus and methods which combine the time honored cooking results of the high power gas and electric range with the time honored cooking results of the low-power, domestic microwave oven. The present invention teaches new methods and new accessories to enhance the utility of the microwave oven apparatus taught in U.S. Pat. No. 3,985,990 in gas and electric cooking.

U.S. Pat. No. 3,985,990 discloses a microwave oven kit which contains the following elements:
1. an outer metal pot,
2. an inner metal pot which has a perforated base fitted into the outer pot,
3. a glass cover, and
4. an insulating means which protects the outer metal pot from chance contact with electrically conductive microwave oven walls.

U.S. Pat. No. 3,985,990 teaches a collection chamber, between said two metal pots, shielded from exposure to microwave energy. In operation, microwave energy penetrates the glass to heat a food and to drive off liquids and vapors from the food. Small amounts of the vapor, condense on the inner walls of the cover and the outer walls of the inner pot. Large amounts of vapor condenses on and, as liquid, fall from the food supporting surface of the inner pot. The food supporting surface, of the inner pot, acts as a heat exchanger. It exchanges the cold of the food it contacts with the latent heat released as vapor condenses on exposed portions of said food supporting surface. Liquid by-products, released as the food cooks in the inner pot, pass through the perforated base of the inner pot into the collection chamber. The condensed vapor and said liquid by-products collect in the collection chamber.

U.S. patent application Ser. No. 07/201,606 filed 06/03/88 concerns other improvements on U.S. Pat. No. 3,985,990 which could be useful here.

STATEMENT OF THE PRESENT INVENTION

According to the present invention the microwave oven, heating apparatus, of U.S. Pat. No. 3,985,990, is fabricated to take on added utility in or on a conventional gas or electric range. The improved apparatus and methods, of the preferred embodiments of present invention, are summarized as follows:

1. The apparatus is fabricated to withstand greater than 500° F. oven temperatures and is suitable for cooking, crusting and browning food therewith on or in a conventional range.
2. Perforations are specially placed and special standoff construction is located on the walls of the inner metal pot.
3. The inner pot is provided with handles.
4. The cover is improved by:
   a. a handle which circles the cover for convenient removal of the apparatus when the apparatus is used on a microwave turntable;
   b. the cover is constructed so that, inverted, it will contain the outer and inner pot therein for convenient shipment and storage of the apparatus. The cover is designed to be useful as 1) a salad bowl, 2) a microwave oven and/or thermal oven cooking dish, and 3) a drain pan for nesting the perforated inner pot, containing hot and oozing food, therein;
   c. a handle or handles, located at the center of gravity, of the cover, to facilitate convenient inversion;
   d. handles which are fabricated to electrically space the outer metal pot from accidental contact 1) with a microwave oven wall, on which there is little or no electrical insulation and 2) with other metal apparatus in simultaneous use in the same oven;
   e. a metal guard and handle combination, attached to the rim of the cover, to impede breakage and secure glass shards if the cover is broken;
   f. the cover is constructed to weigh between 1 and 3 pounds and is designed to mate with the outer pot so that the food, thereunder, is cooked under 1 to 3 pounds of steam pressure; and
   g. the cover is fabricated to drip condensed liquids onto a food to baste the food.
5. The present invention teaches a method where the by-products, of a cooking food, are used as a constituent for simultaneous cooking of a food in a microwave-shielded, by-product, collection chamber. For example, microwave cooking and then conventionally roasting of a chicken while, at the same time, preparing and cooking a chicken stuffing, constituted with the by-product juices and fat, of said cooking chicken, in a microwave shielded, collection chamber.
6. A method in which meat is:
   1) initially frozen, while wedged in the open top of a metal pot whose open top tapers down to a smaller perforated bottom, and
   2) subsequently, defrosting and cooking said meat, in a microwave oven, as it shrinks and drops to the perforated bottom of the pot.
7. A method in which chunks of meat are skewered, on a heavy metal skewer and cooked, on a metal perforated food supporting surface, in a microwave oven. Said chunks of meat standoff the metal skewer from electrical contact with said metal food supporting surface.
8. Apparatus and methods of cooking food where the food is suspended vertically on supports projecting from the base of a perforated metal pot.
9. Apparatus and methods of cooking food where the food is supported, on an adjustable, metal grid, horizontally above and not in contact with the base of a perforated metal pot.
10. Improvements in methods of employing stuffing and coating mixes.
11. Apparatus and methods of cooking food where the food is cooked by heat stored in an 8 oz. to 5 lb. heat sink supported above the base of a metal pot.

a. Alternately, the heat sink may consist of multiple elements which can be employed as "hot", the antithesis of "ice", cubes.

Prior art teaches various ways to simulate the cooking results of a gas and electric range in microwave cooking.

Prior art teaches to use 1) glass-ceramic and metal microwave browning grills, 2) microwave-convection ovens, 3) microwave, infra-red-broiler-element oven combinations and 4) to first cook a food in a microwave oven and then in a conventional range. This invention teaches methods of integrating conventional thermal cooking with microwave cooking to prepare meals which include soup, poultry, meat, fish, vegetables, stuffing recipes, crusting recipes and pasta side dishes. The improved apparatus and cooking methods, herein taught, are useful in a microwave-conventional oven combination or a microwave oven and a separate conventional gas or electric range.

DESCRIPTION OF THE DRAWINGS

FIG. 9 illustrates an alternative construction for the outer pot.

FIG. 10 illustrates how meat chunks, on a metal skewer, previously cooked in a microwave oven, are broiled under a conventional electric broiling element.

FIG. 17 Illustrates a chicken, vegetables and potatoes in the inner pot.

DESCRIPTION OF THE PREFERRED EMBODIMENTS

Figure 1:
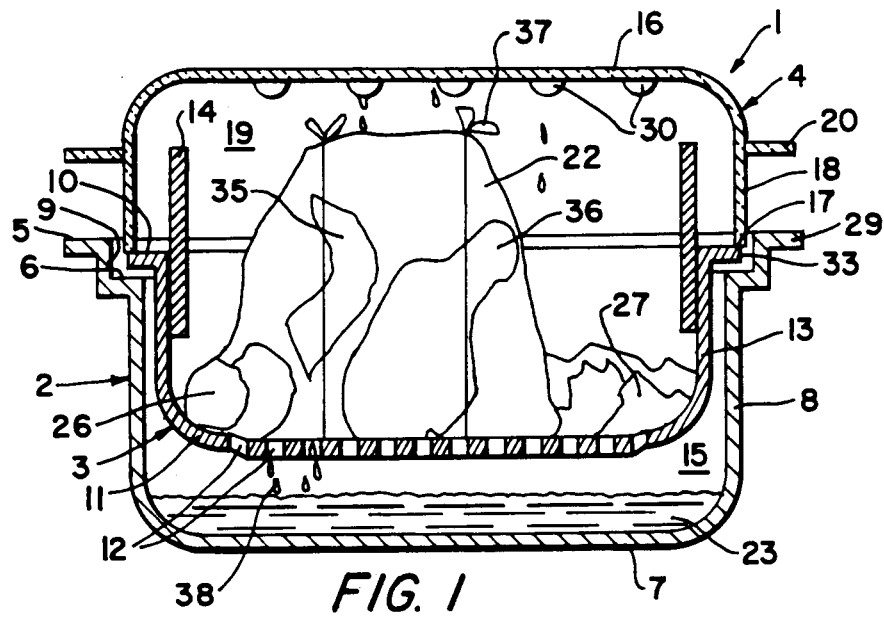
FIG. 1 is a schematic cross-section illustration of the assembled apparatus including a chicken in the inner pot and chicken stuffing in the outer pot.
Figure 5:
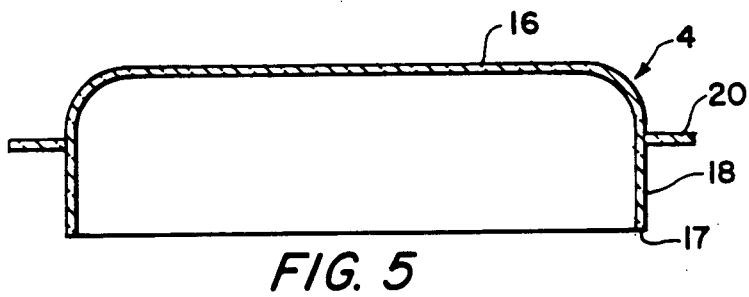
FIG. 5 is a cross-section view of the cover.
Figure 3:
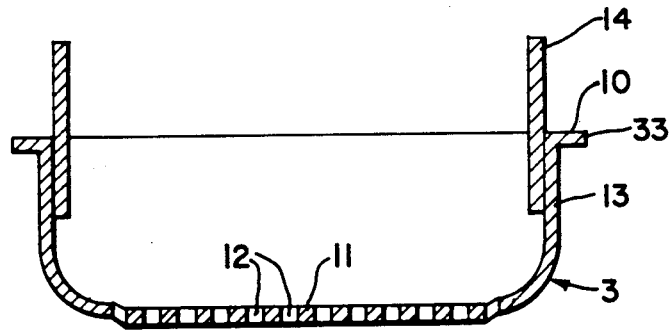
FIG. 3 is a cross-section view of the inner pot.
Figure 2:
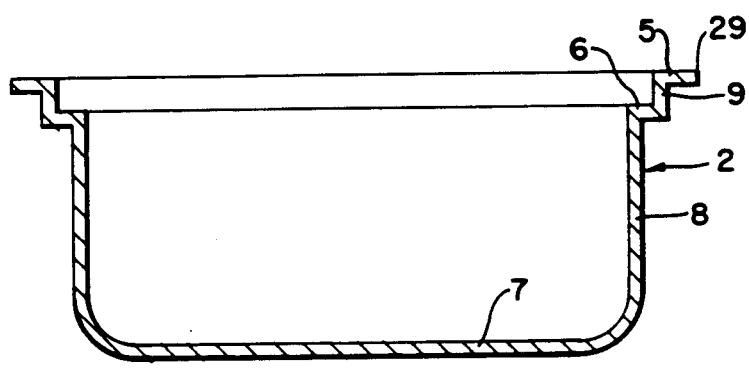
FIG. 2 is a cross-section view of the outer pot.
Figure 6:
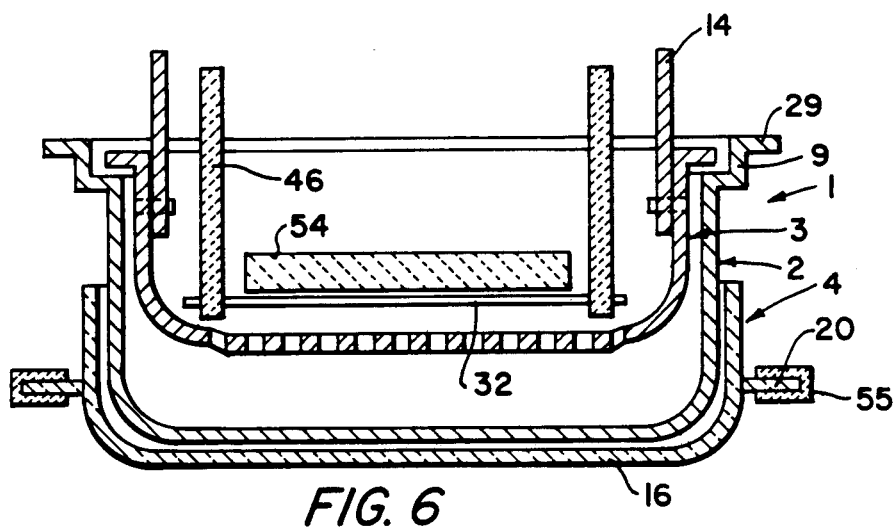
FIG. 6 is a schematic cross-section of the apparatus nested for shipping and storage.

Illustrated in FIG. 6, is a preferred embodiment of the present cooking kit 1. Kit 1 includes outer metal pot 2, inner metal pot 3, cover member 4, and "skewer-grid" stand 32, 46 and may include a microwave lossy heating element 54. Kit 1 is manufactured from material suitable for cooking food therewith and, except for cover 4, capable of withstanding temperatures present under a conventional, electric or gas, broiler element. Pots 2 and 3 are fabricated of stailess steel, aluminum, aluminum-clad steel, porcelain enamel coated steel or other metals As seen in FIG. 1, outer pot 2 has an outwardly extending handle 29. Outer pot 2 has a base 7, and upstanding side walls 8. Handle 29 includes step landing 6, handle wall 9 and upper rim 5.

In a preferred embodiment, the general shape of the cooking kit is circular having a diameter of 6 to 13 inches. Alternately, rectangular and oval shapes may be employed having a short dimension of 6 to 13 inches and a long dimension of 8 to 18 inches. The height of the inner pot from base to rim preferably is 1.5 to 8 inches. Cover member is preferably dome-shaped with a height from 2 to 6 inches and weighs one half to five pounds.

Perforations 12, on inner pot 3 are of sufficient size to permit the flow of liquids and gases between inner pot 3 and outer pot 2. The space between inner pot 3 and outer pot 2 comprises a chamber 15 which is shielded from microwave energy by being entirely surrounded by metal. Chamber 15, during a serving interval, after cooking, acts, when empty, as a heat insulator and, when full after cooking, as a heated thermal sink to keep cooked food hot. Perforations 12, of inner pot 3, are of suitable size to bar the passage of microwave energy into shielded chamber 15.

Cover 4 is formed from microwave-transparent, heat-resistant material which is, preferably, light-transparent and not tinted. Cover 4 is preferably dome shaped with a flat outer top. Cover 4 combines with inner pot 3 to define steam chamber 19 for confining a steam pressure around food 22.

Figure 4:
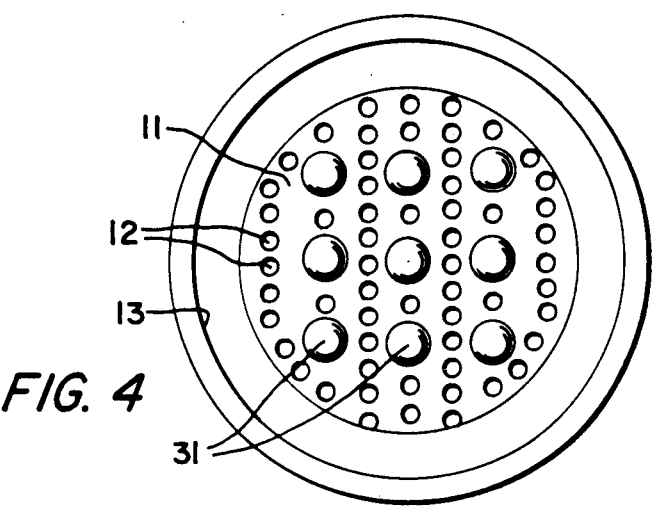
FIG. 4 is a cut away top view of the bottom of the inner pot.

Inner pot 3 is a food-supporting pot having, at its top, upper rim 10 and outwardly extending rim flange 33 adapted to rest upon bottom step landing 6 of outer pot 2. Inner pot 3's food supporting base 11 has drainage perforations 12 which are large enough to permit the flow of liquids and gases and small enough to preclude or substantially minimize the passage of microwave energy. Openings of 1/16 to ⅛ inch are acceptable. A typical perforation pattern is illustrated in FIG. 4. Preferably the perforations, which surround the circumference of base 11, are of such number and size so as to isolate base 11, thermally, from side walls 13, of inner pot 3, when base 11 is employed as a heat exchanger. Preferably, perforations 12 should remove, at least 40% of the metal around the circumference of base 11.

In order to facilitate lifting inner pot 3 from outer pot 2, a handle means 14 is provided. Handle means 14 may be made of steel welded to a steel inner pot 3 or an aluminum handle may be riveted to an aluminum inner pot 3.

While a generally circular shape has been illustrated as a preferred embodiment, it should be understood that the plan view can be oval, rectangular, rounded, square or other suitable geometrical pattern. The shape of the container may be chosen to shield food 22 on its sides so that the sides, of food 22, are protected from horizontal exposure to microwave radiation by metal side walls 13 to impede edge and end heating.

Between inner pot 3 and outer pot 2 there is a shielded chamber 15 in which liquid by-products, of a food are collected and retained without further exposure to microwave energy.

Figure 8:
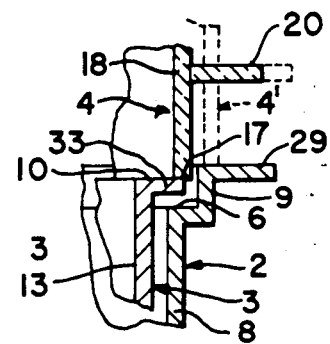
FIG. 8 is a cross-section illustrating how the rims of the cover, inner pot and outer pot assemble together.

Cover member 4 has a rim 17 which mates with landing 33 of inner pot 3. Cover wall 18 extends from upper flat surface 16 to rim 17. As seen in FIG. 8, cover rim 17 may engage with upper landing 33 of inner pot 3 or, as seen in phantom, may engage with handle 29 of outer pot 2 to complete the walls of chamber 19. The use of lighttransparent, not tinted, heat-resistant glass is preferred because it permits the visual inspection of the contents of kit 1 and is equally useful in a high temperature thermal oven and in a microwave oven. The cover 4 preferably weighs circa 2.5 pounds so food, thereunder, is cooked under 2.5 pounds of steam pressure. Preferably, cover 4 is fabricated from microwave transparent material such as heat resistant glass or glass-ceramic. Some may prefer to make cover member 4 slightly microwave lossy so that moisture will not condense on it.

Chamber 19 confines vapors which condense on cover 4 of chamber 19 and, in greater amounts, condense on base 11 of inner pot 3 which acts as a heat exchanger. Steam, liquid condensed from vapor, and liquid by-products of cooking pass through perforations 12 in base 11 into shielded chamber 15 where, shielded from microwave energy, the vapors will cool and condense. Liquid by-products, in shielded chamber 15, remain relatively cool during microwave cooking.

Cover 4 is equipped with one or more handles 20. Handle 20 may circle cover 4, so that cover 4 may be conveniently removed, from any position, when the apparatus is used on a microwave turntable in a small microwave oven. Cover handles 20 mate with outer pot 2 handles 29, which circle outer pot 2, to facilitate secure and convenient transportation of kit 1. Cover 4 may be designed to, in operation, electrically space the metal outer pot 2 from chance contact with the metal walls (not shown) of a microwave oven (not shown). As illustrated in FIG. 6, for convenient shipment and storage of the apparatus, cover 4 is fabricated so that, inverted, it will contain outer pot 2 and inner pot 3 therein.

Cover 4 is made invertible. When inverted, cover 4 can take on added utility, for example inverted cover 4 can be used as 1) a salad bowl, 2) a microwave cooking dish, and 3) a thermal oven baking dish.

Cover handles 20 can be located at the center of gravity of the side walls 18 of cover 4 to facilitate convenient inversion. Inverted, cover 4 is useful as a drain pan when, after microwave cooking, perforated inner pot 3, containing hot and oozing food 22, is removed from outer pot 2 and nested therein. Such nesting provides convenient access when it is desired to add or remove food from chamber 15. Inner pot 3 nested in cover 4, is useful as a cooking apparatus and as a serving platter for hot oozing food.

Figure 9:
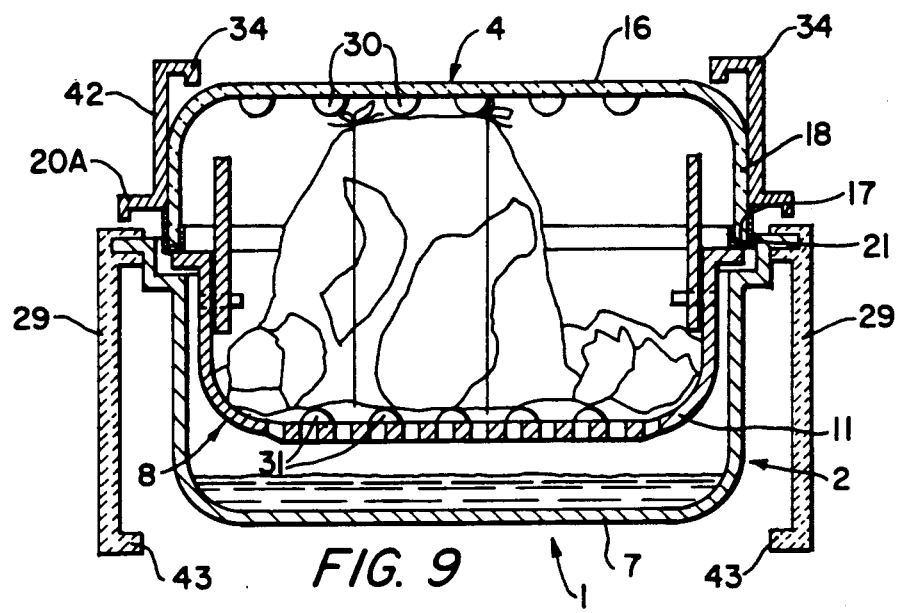
FIG. 9 is a schematic cross-section illustrating another embodiment of the assembled apparatus, including a chicken in the inner pot and chicken stuffing in the outer pot, where the cover is provided with a metal handle and rim guard combination. Additionally.

Handle member 20 may be cast from the same heat resistant, transparent material which forms cover member 4. Alternately, as illustrated in FIG. 9, a metal handle member 20 may be fastened to cover member 4 as part of a metal protector rim 21 secured to rim 17 in a well known manner. Protector rim 21 serves to protect cover 4 from accidental breakage and, if breakage does occur, to keep the broken pieces of glass together. At least three, metal supports 42 can project from metal cover rim 21 to a lever higher than the top of cover 4 so that, when a not round top 16 is inverted, metal supports 42 become cover feet 34. Additionally, FIG. 9 illustrates an alternative construction for outer pot 2 where handle 29' turns downward and becomes pot feet 43. Pot feet 43 are disposed lower than base 7 of outer pot 2 to thoroughly insulate base 7 from a heat-sensitive, serving surface. FIG. 9 illustrates optional food supporting standoff construction 31 on base 11 of inner pot 3.

COOKING METHODS

The present cooking kit 1 may be employed to prepare a multiple course meal which includes soup, poultry, meat, fish, vegetables, bread stuffing recipes, crusting recipes, and rice and pasta side dishes. The improved cooking methods, herein taught, are useful in a microwave-thermal oven combination or a microwave oven and a separate gas or electric range.

An example of how the apparatus is used to prepare a roast chicken dinner follows:

In FIG. 1, raw, cleaned chicken 22a is placed in inner pot 3 which is nested in outer pot 2. The chicken's wings 35 and legs 36 are tied 37 to the body of chicken 22a so that, during an exposure to microwave energy, wings 35 and legs 36 will not over cook (e.g. end heat). The assembled kit 1, containing chicken 22a, is placed in a microwave oven (not shown). During microwave cooking, microwaves penetrate transparent cover 4 and raise the temperature of chicken 22a. As the temperature of chicken 22 increases, some of the juices volatilize and condense on the inner surface of cover 4 and on base 11 of inner pot 3. The liquid condensed, from said vapor, falls into shielded collection chamber 15 to become by-product pool 23. As the cooking proceeds, juices 38 (e.g. water, fats, oils and other drippings) pass from chicken 22a through perforations 12, of base 11, of inner pot 3 and are collected in shielded chamber 15. Initially, the temperature of base 11 of inner pot 3 is, by thermal conduction, cooled, by the temperature of chicken 22a, to below its dew point. Base 11, of inner pot 3 and chicken 22a are in contact. Base 11 cannot become significantly hotter or colder than the parts of chicken 22a that it contacts. Conversely, said chicken parts cannot become significantly hotter or colder than inner pot 3. During microwave cooking, base 11 of inner pot 3, is held below the vapors dew point by the uncooked chicken parts it contacts and is heated by the release of the latent heat of vaporization as steam condenses thereon.

It is preferred to fill the space, beside the chicken 22a, with potatoes 26, vegetables 27 and the like. When the food contacting surface of inner pot 3 is filled with food, microwave side and end heating are impeded. In a filled metal pot, the preponderance of microwave energy irradiates the top of the food and can brown and crust said top. This top surface heating can be enhanced by making the depth of the pot a multiple of the minimum depth required to properly contain the food.

Vegetables 27 may be introduced into inner pot 3 initially or while chicken 22a is cooking. Some may prefer to cook onions, celery, carrots, potatoes and the like along with chicken 22a so that the by-product juices 38, from cooking vegetables 27, pass into the shielded chamber 15 and blend in by-product pool 23 with chicken drippings, to constitute a nutritious, chicken soup stock.

Throughout the cooking process, juices 38, from chicken 22a, potatoes 26 and vegetables 27, are collected in the cool, shielded chamber 15 between outer pot 2 and inner pot 3. Usually, by-product pool 23 is light in color and clear because there has been no significant thermal deterioration of the juices. Desirably, in outer pot 2, directly over the open burners on a conventional stove top, by-product pool 23 can be used, to prepare consomme, soups, sauces, gravies and other food.

By-product pool 23 can be poured from outer pot 2 into a suitable collector (e.g. a bowl or cup) and placed in a refrigerator for cooling. Refrigerated fats and greases rise and solidify on the surface of the by-products, in said collector, for easy removal.

When microwave energy irradiates a food, in a completely glass (e.g. microwave transparent) container, it divides and heats all outer surfaces of the food. When microwave energy irradiates a food, in a deep metal pot, it concentrates and heats the top exposed surface of the food. There is more spot and selective heating in deep metal pots than occurs in glass pots.

The metal food supporting surface shields the food it contacts from spot and selective heating. The metal food supporting surface is heat conductive and equalizes the heat distribution across its surface in any spot and selectively heated food surface it contacts. In a metal pot, each time a food is turned over, the former top of the food, which was spot and selectively heated, rapidly uniformly heats.

When chicken 22a has been cooked to a desirable internal temperature (e.g. 190° F.), generally, its upper surface will exhibit some darkening ("browning") as a result of direct absorption of microwave energy. Continued microwave cooking will increase the surface browning along with a deep browning and drying of the chicken 22a which some consider objectionable.

In prior art gas and electric roasting, first the thermal oven is preheated, for circa 10 minutes, to a predetermined temperature, for example, 325° F. Then, a defrosted three pound chicken is placed in the 325° F. oven and roasted for 3 hours. In contrast, in the present invention, the chicken starts cooking as soon as the microwave oven is turned on. Advantageously, using the present apparatus and methods, a frozen, three pound chicken is defrosted and cooked in 35 minutes.

A chicken roasted, in a thermal oven, is brown and produces little gravy. A chicken cooked, in a microwave oven, is more succulent, less brown and produces significantly more gravy. This invention teaches how to combine the advantages of conventional cooking (e.g. flavor and color) with microwave cooking (e.g. speed-defrosting, speed-cooking, less shrinkage, and succulent taste).

In the present invention, required, conventional oven preheat time takes place simultaneously with microwave cooking. During the circa 20 minutes required for the conventional oven to preheat, to circa 500°, the food is cooked, at full power, in the microwave oven. Then, the cooked chicken is placed into the abnormally, hot, circa 500° F. (i.e. a temperature too hot for conventional thermal cooking), thermal oven and there, while the chicken is resting/standing, from being cooked in the microwave oven, the chicken is browned to individual taste.

The present invention obviates the need for resting/standing time. Prior art teaches that, after thermal roasting, the chicken must stand for a predetermined time before serving. In like manner, prior art teaches that, after microwave cooking, the chicken must stand for a predetermined time before serving. Using the present teaching, advantageously, the normally required thermal oven standing time, is no longer required as the required, circa-20-minute, microwave standing time takes place, while the chicken is surface browning in an abnormally-hot, thermal oven.

Prior art teaches the sequential heating of a food, first in a microwave oven and then on a conventional range. This invention teaches the concurrent cooking of a meal in an improved apparatus which combines the advantages of microwave cooking with the advantages of gas and electric cooking. This invention teaches to use the by-products of microwave cooking (e.g. nutritious juices) as prime constituents of a complementary side dish. Said other ways: A stuffing is prepared, cooked and crusted concurrent with the roasting of the microwave-cooked chicken and the baking of the potato that help to produce it. A browned and crusted, chicken-stuffing side dish is prepared using the microwave-rendered, by-product juices of vegetables and chicken concurrent with the cooking of said vegetables and chicken.

One of the advantages of the present invention is that it makes the roasting of frozen meat, frozen potatoes, frozen turkeys and the like practical. The advantages of storing meat and vegetables, at freezing temperatures, are well known. By first "surface-defrost-wetting" a frozen food, most frozen foods can be defrosted and cooked, in the present kit, in domestic (i.e. circa 700 watt) microwave ovens, on the highest power setting. Frozen meat is roasted and frozen potatoes are baked, using full power, with the full flavor and appearance of conventional cooking. "Surface-defrost-wetting" is more fully described in U.S. Pat. No. 4,390,555 and consists of spraying, washing or soaking the frozen chicken, frozen potatoes and other frozen food in hot water immediately before exposing them to microwave energy.

"Surface-defrost-wetting" can enhance microwave surface browning which in turn shortens the time required to finish browning in an electric or gas oven. Advantageously, "Surface-defrost-wetting", of a chicken, on both its outer surface and the walls of its empty cavity, creates a large target area for microwave energy which limits spot and selective heating.

In the prior art, the directions, for preparing and cooking stuffing mixes, in gas and electric ovens are not the same as the directions for preparing and cooking stuffing mixes in microwave ovens. For example, the directions for General Mills' "Stove Top ® Stuffing Mix" follows:

"1) Gas and electric directions—Combine contents of Vegetable/Seasoning Packet and 1¾ cups water in a medium sauce pan. For more moist stuffing, increase water 2 tablespoons; for less moist decrease water 2 tablespoons. Add ¼ cup (½ stick) butter or margarine. Bring to a boil; reduce heat. Cover, simmer 6 minutes. Add Stuffing Crumbs; stir to moisten. Cover; remove from heat; let stand 5 minutes. Fluff with fork. Makes 3 cups or 6 servings ½ cup each.

2) Microwave directions—Combine contents of Vegetable/Seasoning packet, 1½ cups hot water and ¼ cup (½) stick butter or margarine, cut in pieces, in 1½ quart nonmetal dish. Add Stuffing crumbs and stir to moisten. Cover and cook in microwave oven 5 minutes. Fluff with fork before serving."

The microwave cooking of a four pound chicken 22a, in the present Kit 1, can result in an accumulation of circa two cups of liquid by-products in the pool 23 in microwave shielded collection chamber 15. Said two cups of liquid are circa ¼ fat. This invention teaches that, when microwave cooking phase is finished, and, before the thermal crusting and browning, liquid by-products from the pool 23 are, either in outer pot 2 or in inverted cover 4, mixed with a prepared stuffing mix. The nutritious, liquid by-products replace the water required by said General Mills' stuffing mix and the ¼ cup of chicken fat replaces the ¼ cup of butter or margarine required by the stuffing mix. Thereafter, in outer pot 2 or in inverted cover 4, both oven safe cooking utensils, the stuffing mix is placed into the microwave oven and cooked. Then it is roasted, browned and crusted in a preheated conventional oven. Stuffing 23 is prepared and cooked concurrent with chicken 22a. They can be served together. The term stuffing mix is used to include bread, rice and pasta products. Some pasta products take circa 20 minutes to cook properly which is a time close to the time required, in a 500° F. oven, to brown chicken 22a.

In the prior art, the directions, for preparing and cooking seasoned coating mixes, in gas and electric ovens are not the same as the directions for preparing and cooking said mixes in microwave ovens. For example, the directions for General Foods' "Shake 'n Bake ®" follow:

"1) Gas and electric oven directions—For 7-8 pieces, use 1 pouch and bake 50 minutes at 400° F.

a. Measure: Using above directions, measure mixture into shaker bag, into any sturdy bag or onto flat surface.

b. Moisten: Moisten chicken with water or milk. Shake off excess.

c. Coat: Place 1 or 2 pieces at a time in bag and shake or dip each piece in mixture, turning to coat. Discard any unused mixture remaining in bag or on flat surface.

d. Bake:

(1) Conventional and Toaster Oven: Place chicken onto ungreased baking sheet and bake according to chart, or until tender.

(2) Microwave: Arrange chicken in nonmetal pan, placing largest part of chicken pieces closest to outside edges. Bake according to chart, turning pan once halfway through cooking time.

(3) To prepare boneless, skinless chicken and turkey cutlets: Dip cutlets in beaten egg, then coat as directed for chicken parts. Bake at 400° F. for 15 to 20 minutes, or until tender."

A crusting mix 45 (FIG. 7) may be added to chicken 22a after it has been fully cooked in a microwave oven and before thermal browning. After microwave cooking, the preponderance of liquid by-products and fat have been cooked out of chicken 22a and are no longer present to wash crusting mix 45 off the sides of chicken 22 as chicken 22a roasts in thermal oven. Moreover, the moist surface, of fully, microwave-cooked chicken 22a, obviates a prior art step, taught supra, of wetting the chicken to enhance the adhesion of the crusting mix.

While roasting a chicken has been described, it should be understood that the present method is not limited to whole chickens and large roast but may include roasts, steaks, hot dogs, lamb and pork chops, hamburgers, chicken parts, meat loaves and the like. After microwave cooking, the cook may choose to employ a thermal oven cavity, a thermal oven broiler, a range top or a rotisserie to complete the browning.

Figure 7:
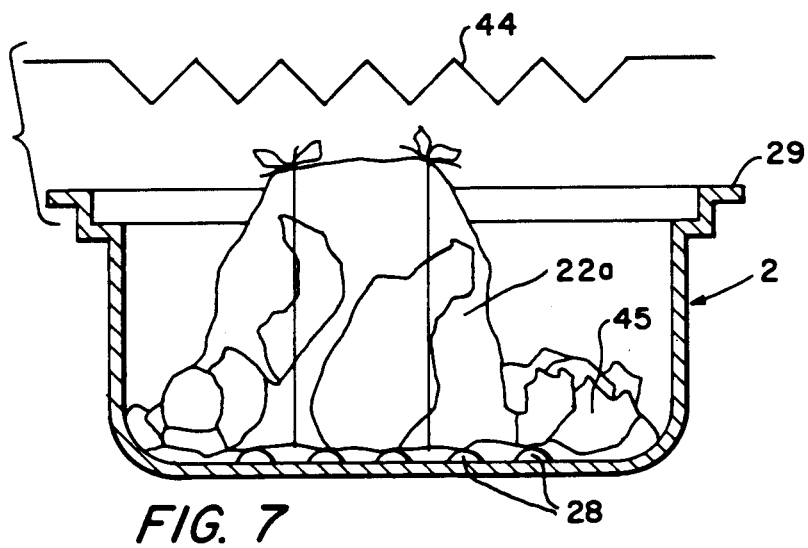
FIG. 7 is a cross-section view of a section of the outer pot, holding a chicken therein, roasting under a conventional electric oven broiler element.

Some may prefer to complete the browning or broiling of chicken 22a in perforated inner pot 3 nested in outer pot 2 with cover 4 in position. A heavy cover 4 provides pressure cooker results. Cover 4 confines the splatter inherent in conventional roasting. Still others may prefer removing cover member 4 to achieve a different browning and crusting. Others may complete the cooking of chicken 22a by transferring chicken 22a from inner pot 3 to outer pot 2. As shown in FIG. 7, outer pot 2, is useful for broiling and as a serving utensil.

Some may wish to use by-product pool 23 as stock for a soup cooked, in outer pot 2, on a range top (not shown). In which case, chicken 22a is transferred from outer pot 2 into cover 4 and therein, at the same time the soup is boiled on top of the range, the chicken 22a is roasted in the range's oven.

Figure 10:
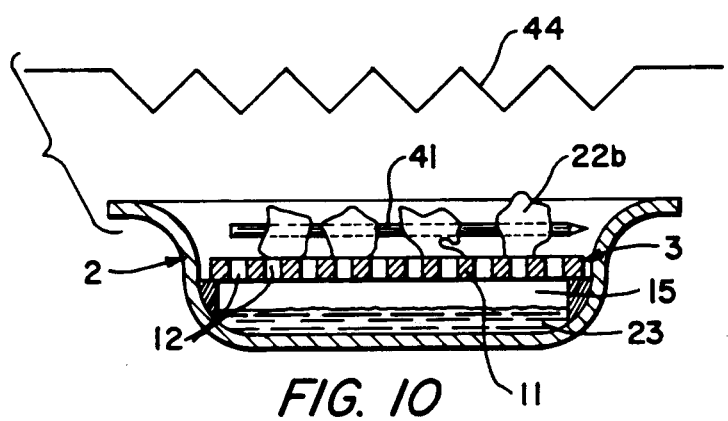
FIG. 10 is a schematic cross-section illustration of an alternative embodiment of the inner and outer pots.

The kit 1 can be used to broil hamburgers, steaks, chops, hot dogs, and the like. After microwave cooking the food in kit 1, cover 4 is removed. As seen in FIG. 10 cooked food 22b, on inner pot 2, in outer pot 3, is broiled, under an open gas or electric broiler heating element 44.

As seen in FIG. 7, outer pot 2 can be provided with embossed standoff means 28. As seen in FIGS. 4 and 9, inner pot 3 can be provided with embossed food support standoff means 31. Standoff means 28 aide in the draining off liquid by-products from food during cooking. Standoff means 28 and 31 support browning and crusting food 22 above the bottom of outer pot 2 or inner pot 3 and prevent a food from soaking in its liquid by-products while roasting. Standoff means 28 and 31 aide in the drainage of the liquid by-products and in the circulation of hot thermal oven air beneath food 22.

Figure 12:
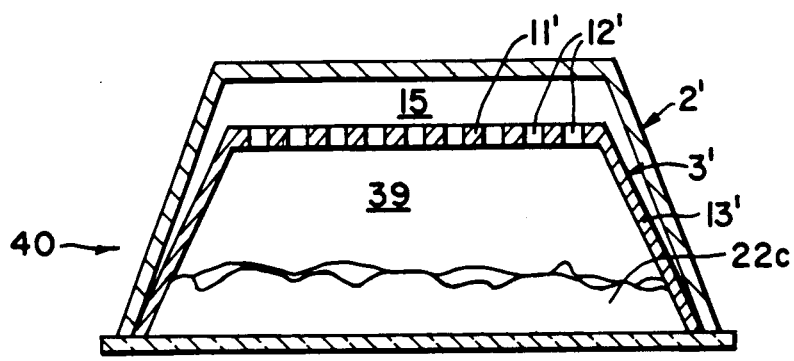
FIG. 12 is a schematic cross-section illustration of another embodiment where the inner and outer pots are tapered and where a pliant portion of meat is wedged into the inverted open top of the inner pot.
Figure 13:
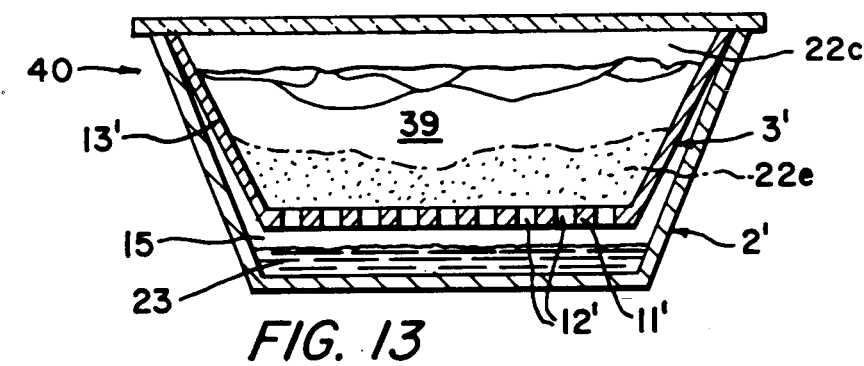
FIG. 13 is a schematic cross-section illustration of frozen assembly corresponding to FIG. 12 inverted.

As seen in FIGS. 12 and 13, outer metal pot 2' and inner metal pot 3' are tapered. Inner pot 3' has side walls 13' which taper down to a small, food supporting base 11', having perforation 12' 22c is disposed on utensil 40 and then covered with inverted inner metal pot 3'. Whereupon, pliant 'meat 22' is physically urged under and into the open top, of inner pot 3', filling said open top. Once in place, in said open top, meat 22c completes open chamber 39 formed by meat 22c, side walls 13' and the inverted food supporting base 11' of inner pot 3'. Meat 22c, in utensil 40 and inverted metal pot 3', is frozen.

When it is desired to cook meat 22c, the inner metal pot 3' is removed from the freezer and inverted, as seen in FIG. 13, so that frozen meat 22c is at the top of open chamber 39. Then, inner metal pot 3', containing frozen meat 22c, is exposed to microwave energy. Whereupon, frozen (e.g. rigid) meat 22c, defrosts becomes pliable and shrinks. The shrinking meat 22c slowly descends down narrowing walls 13' of tapered inner pot 3' until it comes to rest on base 11' as seen in phantom. The taper of inner pot 3' prevents microwave energy from circling the defrosting, shrinking meat and irradiating its lower side.

Prepared as described, the frozen meat is defrosted and cooked, in a microwave oven, in manner more fully described in U.S. Pat. No. 3,985,990, of a one crust, top crust pie baked in an aluminum pie plate. The meat closest to the metal side walls and food supporting base 11 is shielded, by the metal in the sidewalls, from microwave energy. Microwaves enter the meat from the top and rare and medium rare portions are available. Normal projections of meat, which projections, exposed to microwaves, would over cook, burn and toughen the meat unduly, were, as seen in FIG. 12, flattened out before freezing. During microwave cooking, the meat can be inverted to cook the formally the formally shielded side of the meat.

Meat cooked in a microwave oven in tapered pot 3', can be roasted, in a thermal oven, at a temperature higher than would provide satisfactory results if the meat was cooked entirely by said thermal oven.

Figure 11:
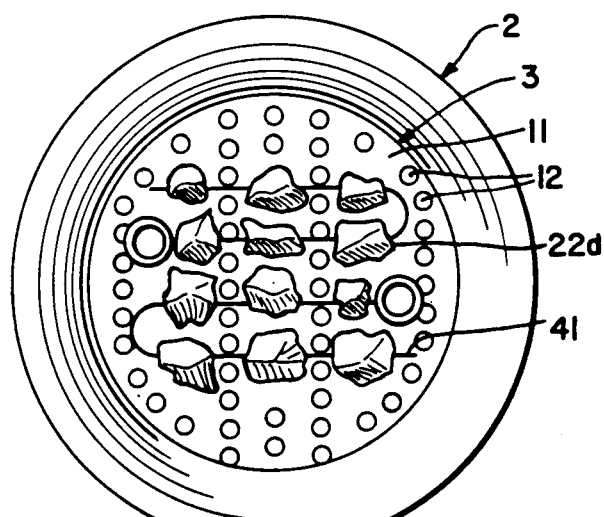
FIG. 11 is a top view of the assembly illustrated in FIG. 10.

As illustrated in FIG. 11, meat may be crusted and browned in a microwave oven by cutting the meat into chunks and placing the meat chunks 22d on a metal skewer 41 and then placing the meat chunks 22d and skewer 41 on the food-supporting surface 11 of inner metal pot 3. The chunks of meat 22d are disposed to prevent the metal skewer 41 from coming close enough to the metal pot so as to support an electrical arc thereto.

The skewered meat chunks 22d, in the kit 1, are exposed to microwave energy. Microwave edge and end heating concentrates energy in the exposed edges and protuberances of the meat chunks 22d crusting and browing them. Heavier metal skewers and first freezing the meat on the metal skewer 41, before exposing them to microwave energy, results in rarer centers of the meat chunks 22d. After microwave cooking, the skewered meat may be further browned and crusted in a conventional oven or under a conventional, broiler, heating element 44.

As illustrated in FIGS. 7 and 10, food may be crusted and browned in a thermal oven, under a conventional, broiler, heating element 44, either in a deep pot or on a shelf or broiling tray. The walls of a deep pot confine heat that would be otherwise lost, and form a barrier between the food and cool air convected towards the heating element.

It is preferred to provide kit 1 with an adjustable "skewer/support" apparatus. As illustrated in FIGS. 10–11 and 14–20, different numbers and arrangement of "skewers" are practical. Heavy, highly heat conductive "skewers" (for example, thick, aluminum "skewer/support" members) shield the food in close contact and carry heat away to provide, for example, rare chunks of meat in FIGS. 10 and 11. Thin, resonant-length, resistive and less heat conductive "skewers" (for example, thin, resonant, lengths of lossy iron) may be employed to burn a grill pattern on food in contact. An assortment of "skewer/support" elements, in type and number, are in contemplation.

Figure 14:
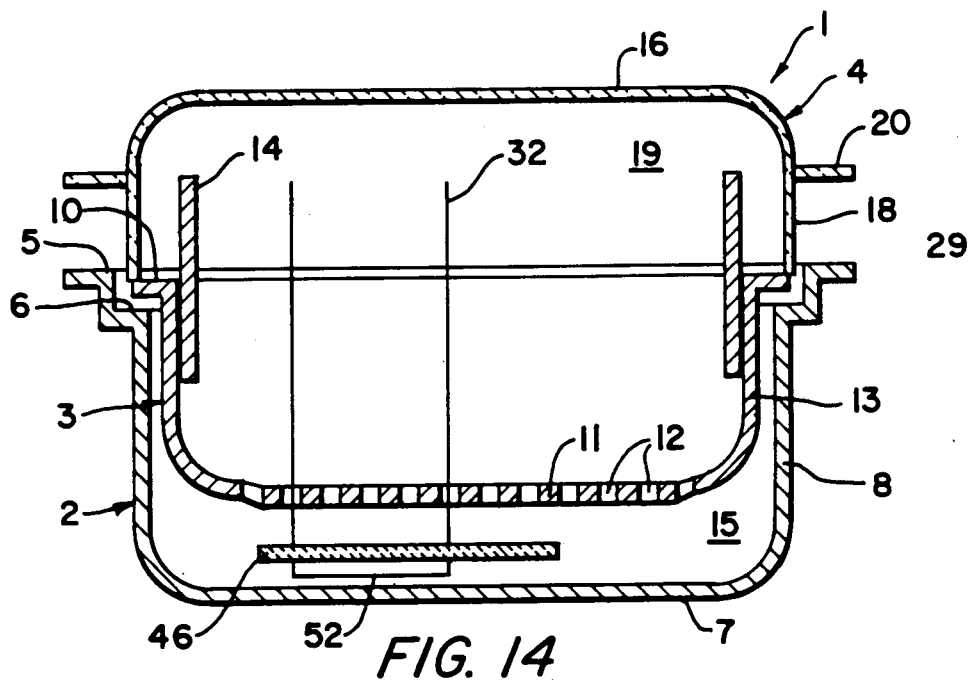
FIG. 14 is a view of one skewer assembly in place in the inner and outer pots.
Figure 15:
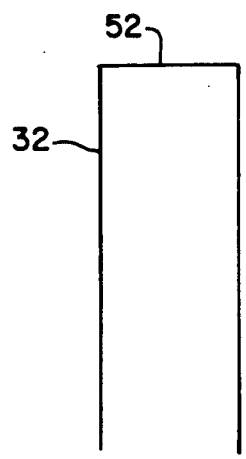
FIG. 15 is a view of the skewer in FIG. 14.
Figure 15A:
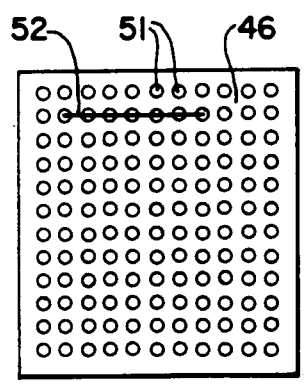
FIG. 15A is a bottom view of the skewer assembly in FIG. 14.
Figure 18:
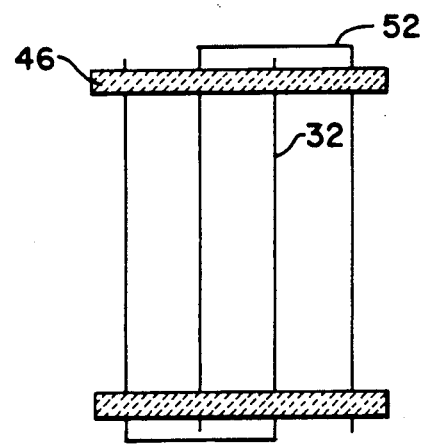
FIG. 18 is a top view of two of the skewer subassemblies of FIG. 14, removed from the pots and connected together to form a food support grid.

As illustrated in FIG. 14, 15 and 15A, two skewers 32 may be connected together by a skewer connector 52 and used in conjunction with a skewer grid stand 46. As seen in FIG. 18, two or more skewer/support apparatus, may be connected to form a shelf, illustrated in FIGS. 19 and 20. Two or more skewers may be used as vertical skewer/support members, illustrated in FIGS. 16 and 17. The "skewer shelf apparatus" may be assembled so that the resultant shelf is at an angle (not shown) to aide in drainage of by-products from a food cooked thereon.

Figure 16:
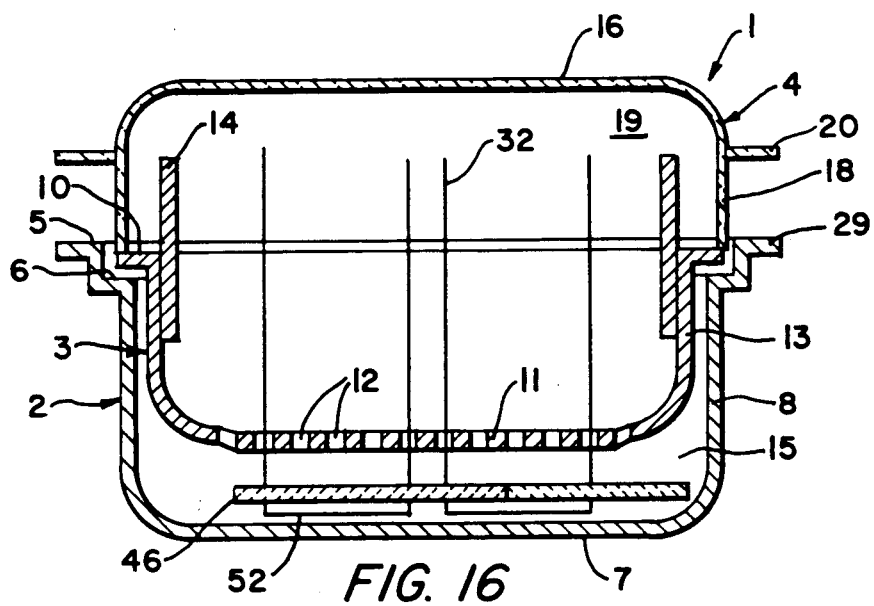
FIG. 16 is a schematic cross-section illustration of the kit illustrated in FIG. 14 with two skewers assemblies one in front and partially hiding the other.
Figure 17:
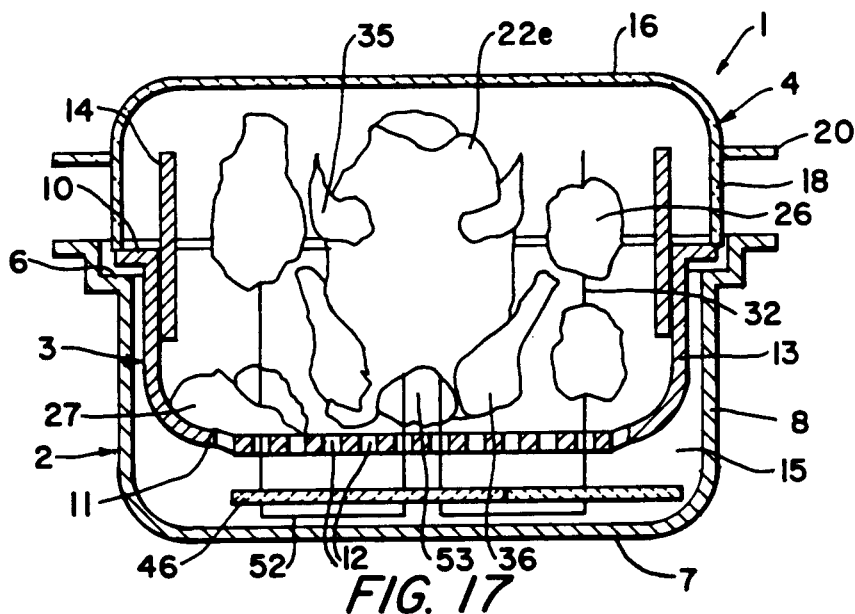
FIG. 17 is a schematic cross-section illustration of the assembled kit which includes a chicken and a potato held vertically, in the inner pot, by the skewers illustrated in FIG. 16.

Two skewer/support members may connected together to form two shelves (e.g. one above the other) (not shown) or connected together overlapping in a horizontal plane as seen in FIGS. 16 and 17. Food may be cooked supported on the skewer/support or skewered onto the skewer/support.

Skewer/grid stand 46 may be fabricated out of heat resistant plastic, glass, glass-ceramic or metal for microwave and conventional oven use. Metal is preferred, for use under an open gas or electric heating element of a broiler.

In FIG. 17, the flat, expansive skewer supports 46 act, in consort with perforations 12, to form a stable base for the vertical rods of skewer 32. The rods of skewer 32 pass into the cavity of chicken 22e and hold it open for better drainage and faster cooking. Held vertically, chicken interior, empty cavity and exterior surface area divides the available, microwave energy across a large target area and so minimizes spot and selective heating. The wings and feet need not be tied to the body. During cooking the chicken is inverted. A chicken has been described, simply as an example. Other poultry and cuts of meat are in contemplation.

Figure 20:
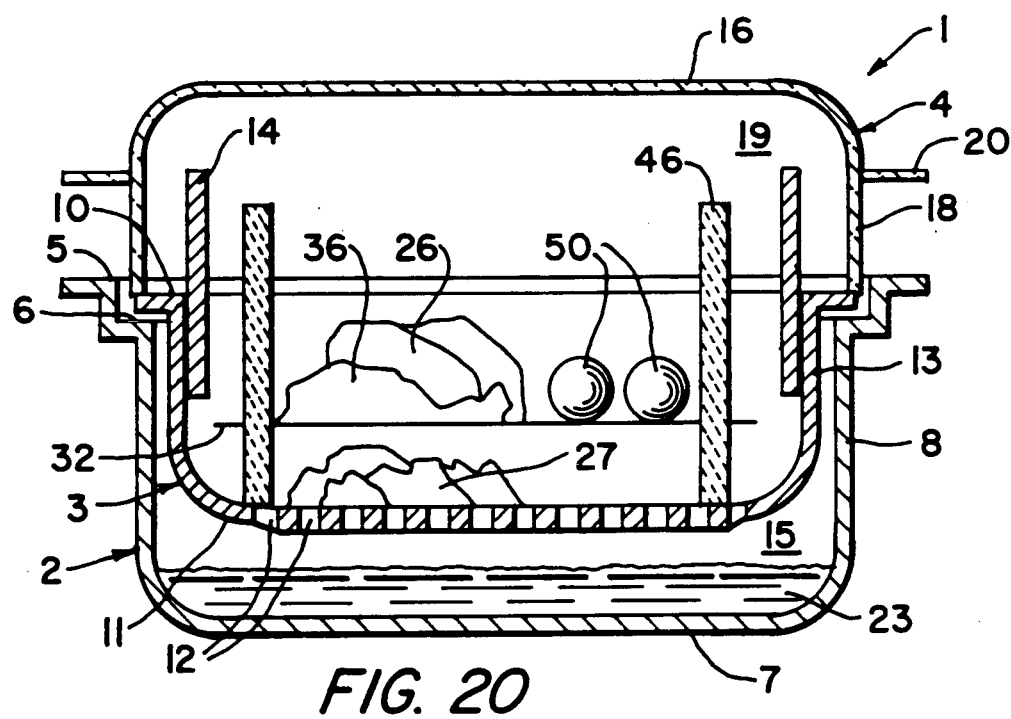
FIG. 20 is a side-view, schematic cross-section of the kit with the skewer assembly of FIG. 18 forming a shelf on the bottom of the inner pot. The skewer grid is shown supporting a chicken leg, potatoes and two hot dogs above vegetables which are disposed in contact with the bottom of the inner pot.

In FIG. 20, chicken leg 36, potatoes 26, hot dogs 50 and the like can be cooked on skewer/support grid stands shelf 32,46 over and above food supporting base 11. Advantageously, microwave energy may better surround the food, better drainage results and food can be branded to show a grill pattern by hot skewers. Moreover, faster cooking items, as vegetables 27 may be disposed in contact with food supporting base 11, beneath said shelf, so that the slower cooking potato and faster cooking vegetables will cook together in the same time frame.

Figure 19:
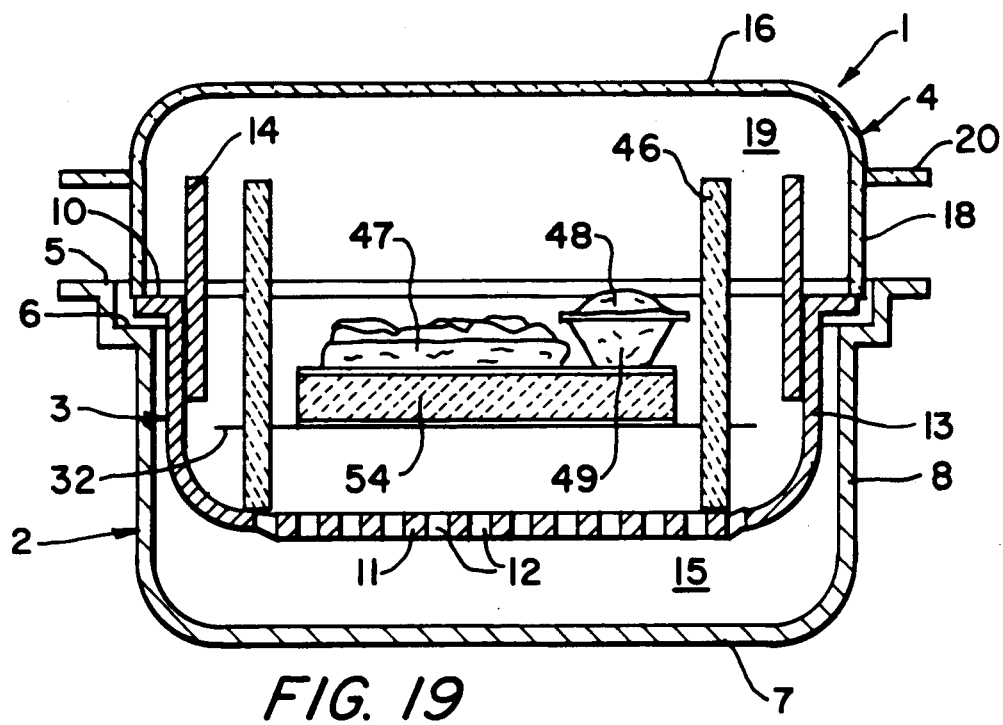
FIG. 19 is a side-view, schematic cross-section of the kit with the skewer assembly of FIG. 18 forming a shelf on the bottom of the inner pot. The skewer grid is shown supporting a thermal heat sink on which a pizza pie and a conventional two crust pie is cooking.

Advantageously, in FIG. 19, a microwave lossy heat sink/heating element 54 may be preheated on adjustable skewer/support grid stands 46,32. First the heating element 54 is preheated whereupon a two crust pie 48, in its aluminum pie plate 49, and/or a pizza pie 47 is placed on said preheated element and the assemblage exposed to microwave energy. If heating element 54 was heated directly on food supporting base 11, heat would be conducted away from heating element 54 by inner pot 3. A cook may, at times, choose not to preheat heating element 54.

Heating element 54 may be a microwave-lossy, five-pound, igneous rock sold under the trade name HOT ROCK. After the five-pound rock has been heated, the whole assemblage, or just the shelf and the rock, may be removed from the microwave oven to the dinner table to replace electric hot trays, Sterno ® cans and/or candles. The heated assemblage can be employed to keep food hot for an extended period thereon. The igneous rock may be in one piece or cut into cubes. Individual cubes may be used by different diners under or in their soup, coffee or the like to keep food or drink hot. In contemplation is kit 1 acting as a "microwave oven hot cube tray" holding a heating element 54 made up of individual "hot cubes". This the antithesis of ice cubes in ice cube trays.

It should be appreciated that any food, not initially consumed, may be conveniently stored in appropriate members of kit 1. When one practices the improved methods herein taught, there is less cleanup. Microwave cooking, in kit 1, removes the preponderance of by-products, before kit 1 is employed in conventional gas and electric baking, broiling, brazing and frying. When one employs the teachings of this invention, more of the by-products of cooking are available for subsequent utility and less are available to undesirably bake onto the walls of the thermal oven and bake onto the cooking pot.

It is to be understood that the above described apparatus and methods are illustrative of the application of the principal of the invention. Many other arrangements and methods may be devised, by persons skilled in the art, without departing from the spirit and scope of the invention. Accordingly, it is to be understood that the present invention is to be limited only by the spirit and scope of the appended claims.

I claim:

1. A method of combining the cooking of food in a gas or electric thermal oven with the cooking of food in a microwave oven which includes the steps of;
    (a) placing a food, to be cooked, on a food-supporting surface, in an inner metal pot, of a kit which includes:
        where the inner metal pot is nested within an outer metal pot,
        where there is a collection chamber, located between the two metal pots, which chamber is shielded from exposure to microwave energy,
        where a microwave transparent, cover covers, at least, the inner pot, and
        means to pass vapors and liquid by-products from the inner pot to the collection chamber;
    (b) exposing the food, in the kit, to microwave energy until said energy penetrates the cover and heats the food until liquid by-products and vapors emanate from the food,
    (c) channeling the liquid by-products and vapors, which emanated from the food heating in the inner pot, through the means to pass vapors and liquid into the collection chamber where said liquid by-products are collected;
    (c) concurrent, with step (b) and (c), the thermal oven is preheated to a temperature, at least, 50° F. higher than would provide satisfactory results if the food was cooked entirely by the thermal oven without the aide of the microwave oven; and
    (d) thereafter removing the food from the microwave oven and placing said food into said preheated thermal oven to brown and crust while said food is, simultaneously, resting from being cooked in the microwave oven.

2. A method of combining cooking in a gas or electric thermal oven with cooking in a microwave oven, according to claim 1, which includes the steps of:
    removing the collected by-products from the collection chamber before placing the microwave cooked food in the thermal oven.

3. A method of combining cooking in a gas or electric thermal oven with cooking in a microwave oven, according to claim 1, which includes the steps of:
    where the food is meat, filling the empty spaces between the sides of the meat and the walls of the inner pot with other foodstuff so that microwave energy entering through the open top of the inner pot is impeded from irradiating the sides of the meat and irradiates the exposed top of the food, and
    turning the food over, at least, once during microwave cooking.

4. A method of combining cooking in a gas or electric thermal oven with cooking in a microwave oven, according to claim 1, which includes the steps of:
    baking and crusting the food, in the thermal oven, at temperatures over 500° F.

5. A method of combining cooking in a gas or electric thermal oven with cooking in a microwave oven, according to claim 4, which includes the steps of:
    fully cooking the food in the microwave oven before browning and crusting the food in the thermal oven.

6. A method of combining cooking in a gas or electric thermal oven with cooking in a microwave oven, according to claim 1, which includes the steps of:
    where the food is of the type that is conventionally broiled,
    removing the cover from the kit to expose the microwave cooked food, removing the collected by-products from the collection chamber and thereafter placing the food in the thermal oven and browning it under the thermal oven's broiler heating member.

7. A method of combining cooking frozen food in a gas or electric thermal oven with cooking in a microwave oven, according to claim 1 which includes the steps of:
    wetting said frozen food to surface defrost said food before cooking said food.

8. A method of combining cooking a frozen food in a gas or electric thermal oven with cooking in a microwave oven, according to claim 7, which includes the steps of:
    wetting the frozen food by soaking the frozen food in hot water for a predetermined time before cooking the food.

9. A method of combining cooking in a gas or electric thermal oven with cooking in a microwave oven which includes the steps of:
    (a) placing a food, to be cooked, on a food-supporting surface, in an inner metal pot, of a kit which includes:
        where the inner metal pot is nested within an outer metal pot,
        where there is a collection chamber, located between the two metal pots, which chamber is shielded from exposure to microwave energy,
        where a microwave transparent, cover covers, at least, the inner pot, and
        means to pass vapors and liquid by-products from the inner pot to the collection chamber;
    (b) exposing the food, in the kit, to microwave energy until said energy penetrates the cover and heats the food until liquid by-products and vapors emanate from the food;
    (c) channeling the liquid by-products and vapors, which emanated from the food heating in the inner pot, through the means to pass vapors and liquid into the collection chamber where said liquid by-products are collected;
(d) removing the cooked food from the microwave oven;
(e) placing said food into a preheated thermal oven to brown and crust while said food is, simultaneously, resting from being cooked in the microwave oven;
(f) employing the by-products of the food, from the collection chamber, as a constituent of a stuffing recipe; and
(g) cooking said stuffing recipe while said food is crusting and browning in the thermal oven.

10. A method of combining cooking in a gas or electric thermal oven with cooking in a microwave oven, according to claim 9, which includes the steps of:
inverting the cover to turn it into an oven safe bowl, preparing the stuffing recipe in the inverted cover, and
crusting and browning the stuffing recipe in an oven in the inverted cover as the food is baked in the inner and outer pot in the thermal oven.

11. A method of combining cooking in a gas or electric thermal oven with cooking in a microwave oven, according to claim 9, which includes the steps of:
inverting the cover to turn it into a bowl,
nesting the inner pot containing the cooked and oozing food in the inverted cover,
placing the food in the inner pot, still nested in the inverted cover, in the thermal oven and crusting and browning the food, and
placing the prepared stuffing recipe, in the outer bowl, into the same thermal oven to cook at the same time the food is crusting and browning.

12. A method of combining cooking in a gas or electric thermal oven with cooking in a microwave oven, according to claim 9, where:
where the prime ingredient of the stuffing mix is pasta.

13. A method of combining cooking in a gas or electric thermal oven with cooking in a microwave oven, according to claim 9, where:
where the prime ingredient of the stuffing mix is rice.

14. A method of combining cooking in a gas or electric thermal oven with cooking in a microwave oven, according to claim 9, where:
where the prime ingredient of the stuffing recipe is bread.

15. A method of combining cooking in a gas or electric thermal oven with cooking in a microwave oven, which includes the steps of:
(a) placing a food, to be cooked, on a food-supporting surface, in an inner metal pot, of a kit which includes:
where the inner metal pot is nested within an outer metal pot,
where there is a collection chamber, located between the two metal pots, which chamber is shielded from exposure to microwave energy,
where a microwave transparent, cover covers, at least, the inner pot, and
means to pass vapors and liquid by-products from the inner pot to the collection chamber;
(b) exposing the food, in the kit, to microwave energy until said energy penetrates the cover and heats the food until liquid by-products and vapors emanate from the food,
(c) channeling the liquid by-products and vapors, which emanated from the food heating in the inner pot, through the means to pass vapors and liquid into the collection chamber where said liquid by-products are collected;
(d) after microwave cooking, removing the inner pot and food from the outer pot,
(e) preparing a stuffing recipe in the outer metal pot,
(f) placing the inner pot and food back into the outer pot, and the stuffing recipe beneath said inner metal pot and with the food on top of said inner metal pot.
(g) removing the food from the microwave oven and placing said food into a preheated thermal oven to brown and crust while said food is, simultaneously, resting from being cooking in the microwave oven.

16. A method of combining cooking in a gas or electric thermal oven with cooking in a microwave oven, according to claim 15, which includes the steps of:
adding a crusting recipe to the food, after the food has been cooked in the microwave oven and before thermal crusting and browning.

17. A method of combining cooking in a gas or electric thermal oven with cooking in a microwave oven, according to claim 16, which, after microwave cooking, includes the steps of:
adding at least a portion of the by-products of the food, collected in the chamber, to a stuffing mix, and cooking said stuffing mix and said food containing said crusting recipe in the thermal oven.

18. A method of combining cooking in a gas or electric thermal oven with cooking in a microwave oven, which includes the steps of:
(a) placing a food, to be cooked, on a food-supporting surface, in an inner metal pot, of a kit which includes:
where the inner metal pot is nested within an outer metal pot,
where there is a collection chamber, located between the two metal pots, which chamber is shielded from exposure to microwave energy,
where a microwave transparent, dover covers, at least, the inner pot, and
means to pass vapors and liquid by-products from the inner pot to the collection chamber;
(b) exposing the food, in the kit, to microwave energy until said energy penetrates the cover and heats the food until liquid by-products and vapors emanate from the food,
(c) channeling the liquid by-products and vapors, which emanated from the food heating in the inner pot, through the means to pass vapors and liquid into the collection chamber where said liquid by-products are collected;
(d) thereafter removing the food from the microwave oven;
(e) removing the collected by-products from the collection chamber
(f) placing said food into a preheated thermal oven to brown and crust while said food is, simultaneously resting from being cooked in the microwave oven;
(g) employing the by-products of the food, as a soup stock,
(h) adding soup ingredients to said soup stock, and cooking said soup while said food is crusting and browning in the thermal oven.

19. A method of combining the roasting of poultry, in a microwave oven, with the cooking of said poultry, in a gas or electric thermal oven, which includes the steps of:

(a) placing the poultry, to be roasted, on a food-supporting surface, in an inner metal pot, of a kit which includes:

where the inner metal pot is nested within an outer metal pot, where there is a collection chamber, located between the two metal pots, which chamber is shielded from exposure to microwave energy, where a microwave transparent, cover covers, at least, the inner pot, and means to pass vapor and liquid by-products from the inner pot to the collection chamber;

(b) exposing the poultry, in the kit, to microwave energy until said energy penetrates the cover, and heats the poultry until liquid by-products and vapors emanate from the poultry, (c) channeling the liquid by-products and vapors which emanated from the poultry heating in the inner pot through the means to pass vapor and liquid into the collection chamber where said liquid by-products are collected;

(d) simultaneously, with step (b) and (c), the thermal oven is preheated to a temperature, at least, 50° F. higher than would provide satisfactory results if the poultry was cooked entirely by the thermal oven without the aid of the microwave oven; and (e) after cooking the poultry, in the microwave oven, for a predetermined time, the poultry is removed from the microwave oven and is placed into the preheated thermal oven to brown and crust the outside of the poultry while the poultry is, simultaneously, resting from being cooked in the microwave oven.

20. A method of combining cooking in a gas or electric thermal oven with cooking in a microwave oven, according to claim 19, the added steps of:

roasting the poultry in the thermal oven while, at the same time, cooking a poultry stuffing recipe, constituted with the by-product juices and fat of the poultry which, during microwave cooking accumulated in the collection chamber.

21. A method of combining cooking in a gas or electric thermal oven with cooking in a microwave oven, according to claim 19, which includes the steps of:

adding a crusting recipe to the poultry, after the poultry has been cooked in the microwave oven and before thermal crusting and browning.

22. A method of combining cooking in a gas or electric thermal oven with cooking in a microwave oven, according to claim 19, which, after microwave cooking, includes the steps of:

adding at least a portion of the by-products of the poultry, collected in the collection chamber, to a stuffing mix, and cooking said stuffing mix, while said poultry is browning in the thermal oven.

23. A method of combining the cooking of meat in a gas or electric thermal oven with the cooking of meat in a microwave oven which includes the steps of:

(a) disposing raw defrosted meat on a utensil and covering the meat with an inverted metal pot where said metal pot has an open top smaller than the portion of meat it covers and has side walls which taper down to a smaller food supporting surface, (b) physically urging the soft meat portion under and into the open top substantially filling said open top so that an open chamber is formed by the top of the meat and the inverted food supporting surface of the pot, (c) freezing the utensil and the metal pot containing the meat, (d) removing the metal pot from the freezer and inverting said metal pot so that the frozen meat is on top of the open chamber, (e) forming an apparatus:

where said metal pot containing said frozen meat is nested within an outer metal pot, where there is a collection chamber, located between the two metal pots, which chamber is shielded from exposure to microwave energy, where a microwave-transparent cover covers the inner pot, and means to pass vapor and liquid by-products from the inner pot to the collection chamber;

(f) exposing the meat, in the apparatus, to microwave energy until said energy penetrates the cover and heats the meat and liquid by-products emanate from the meat;

(g) channeling the liquid by-products and vapors which emanated from the meat, cooking in the inner pot, through the means to pass vapor and liquid into the collection chamber where said liquid by-products are collected while the frozen meat defrosts becomes pliable and shrinks and descends down the taped sides of the metal pot to the bottom of the inner pot.

24. A method of combining the cooking of meat in a gas or electric thermal oven with the cooking of meat in a microwave oven, according to claim 23, which includes the steps of:

simultaneously, with step (f) and (g), preheating a thermal oven to a temperature, at least, 50° F. higher than would provide satisfactory results if the meat was cooked entirely by the thermal oven without the aide of the microwave oven; and, after cooking the meat in the microwave oven, for a predetermined time, the meat is removed from the microwave oven and is placed into the preheated thermal oven to brown and crust the outside of the meat while the meat is resting from being cooked in the microwave oven.

25. A method of combining the cooking of meat, in a gas or electric thermal oven, with the cooking of said meat, in a microwave oven, which includes the steps of:

(a) placing meat chunks on a metal skewer on a food-supporting surface of an inner metal pot of a kit which includes:

an inner metal pot nested within an outer metal pot, a collection chamber, located between the two metal pots, which chamber is shielded from exposure to microwave energy, a microwave transparent cover covering the inner pot, and microwave impermeable, perforate means to pass vapors and liquid by-products from the inner pot to the collection chamber, (b) positioning the skewer so that the chunks of meat standoff the metal skewer from the metal pot to prevent electrical arcing there between and exposing the meat, in the kit, to microwave energy which energy penetrates the cover, cooks the meat and liquid by-products emanate from the meat, (c) channeling the liquid by-products which emanated from the meat cooking in the inner pot, through the microwave impermeable, perforate means into the collection chamber where the liquid by-products are collected, and removing said kit and meat chunks to a thermal oven to brown said cooked meat chunks.

26. A method of combining the cooking of meat in a gas or electric thermal oven with the cooking of meat in a microwave oven, according to claim 25, which includes the steps of:

simultaneously, with step (b) and (c), preheating a thermal oven to a temperature, at least, 50° F. higher than would provide satisfactory results if the meat chunks were cooked entirely by the thermal oven without the aide of the microwave oven; and, after cooking the meat in the microwave oven, for a predetermined time, the meat is removed from the microwave oven and is placed into the preheated thermal oven to brown and crust the outside of the meat while the meat is resting from being cooked in the microwave oven.

27. A method of combining the roasting of frozen poultry, in a gas or electric thermal oven, with the cooking of said poultry, in a microwave oven, which includes the steps of:

(a) immersing the frozen poultry in water for a predetermined time, (b) placing the surface defrosted frozen poultry on a food-supporting surface of an inner metal pot of a kit which includes;

an inner metal pot nested within an outer metal pot, a collection chamber, located between the two metal pots, which chamber is shielded from exposure to microwave energy, a microwave transparent, cover covering the inner pot, and means to pass vapors and liquid by-products from the inner pot to the collection chamber;

(c) exposing the poultry, for a predetermined time, in the kit, to microwave energy whereby liquid by-products emanate from the poultry and a first exposed side of said poultry is cooked, (d) inverting the poultry while draining any liquid accumulation from the cavity of the poultry into said chamber, (e) again exposing the poultry, for a predetermined time, in the kit, to microwave energy to further cook a second side of said poultry whereby more liquid by-products emanate from the poultry, (f) channeling the liquid by-products and vapors which emanated from the poultry cooking in the inner pot through the means to pass vapor and liquid into the collection chamber where the liquid by-products are collected;

(g) preheating the thermal oven to a browning temperature; and (h) after cooking the poultry, in the microwave oven, for a predetermined time, removing the poultry from the microwave oven and placing the poultry into the preheated thermal oven to brown and crust the outside of the poultry while the poultry is, simultaneously, resting from being cooked in the microwave oven.

28. A method of combining cooking in a gas or electric thermal oven with cooking in a microwave oven, according to claim 27, the added steps of:

roasting the poultry in the thermal oven while, at the same time, cooking a poultry stuffing recipe, constituted with the by-product juices of the poultry which, during microwave cooking accumulated in the collection chamber.

29. A method of combining cooking in a gas or electric thermal oven with cooking in a microwave oven, according to claim 27, which includes the steps of:

adding a crusting recipe to the poultry, after the poultry has been cooked in the microwave oven and before thermal crusting and browning.

* * * * *